US006391257B1

(12) United States Patent
Woyciesjes

(10) Patent No.: US 6,391,257 B1
(45) Date of Patent: *May 21, 2002

(54) ANTIFREEZE COMPOSITIONS COMPRISING CARBOXYLIC ACID AND CYCLOHEXENOIC ACID

(75) Inventor: Peter M. Woyciesjes, Woodbury, CT (US)

(73) Assignee: Prestone Products Corporation, Danbury, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/136,027

(22) Filed: Aug. 19, 1998

(51) Int. Cl.$^7$ ............................. C23F 11/14; C23F 11/12
(52) U.S. Cl. ............................. 422/17; 252/73; 252/75; 252/76; 252/77; 252/79; 252/392; 252/394; 252/396
(58) Field of Search ............................. 422/17; 252/392, 252/396, 394, 73, 75, 76, 77, 79

(56) References Cited

U.S. PATENT DOCUMENTS

| | | |
|---|---|---|
| 3,753,968 A | 8/1973 | Ward |
| 3,931,029 A | 1/1976 | Dutton et al. |
| 3,981,682 A | 9/1976 | Ward et al. |
| 4,077,894 A | 3/1978 | Langdon et al. |
| 4,081,462 A | 3/1978 | Powers et al. |
| 4,382,008 A | 5/1983 | Boreland et al. |
| 4,448,702 A | 5/1984 | Kaes |
| 4,476,055 A | 10/1984 | Du Vernet |
| 4,514,335 A | 4/1985 | Du Vernet |
| 4,571,309 A | 2/1986 | Lege |
| 4,588,513 A | 5/1986 | Triebel et al. |
| 4,614,600 A | 9/1986 | Schilling et al. |
| 4,873,011 A | 10/1989 | Jung et al. |
| 4,927,669 A | 5/1990 | Knox et al. |
| 4,946,616 A | 8/1990 | Falla et al. |
| 5,008,039 A | 4/1991 | Woodward et al. |
| 5,174,913 A | 12/1992 | Alford et al. |
| 5,242,621 A | 9/1993 | Miller et al. |
| 5,292,480 A | 3/1994 | Fischer et al. |
| 5,741,436 A | 4/1998 | Gershun et al. |

FOREIGN PATENT DOCUMENTS

WO    WO 97/20901    6/1997

OTHER PUBLICATIONS

Annual Book of ASTM Standards, Section 15, vol. 15.05, D1176, D1384, D1881, D2570, D2809 and D4340 (1996).
Beynon et. al., "Cooling System Corrosion in Relation to Design and Materials," Engine Coolout Testing: State of the Art, ASTM STP 705, W. H. Ailor, Ed., ASTM, Philadelphia, pp. 310–326 (1980).
Darden et al., "Monoacid/Diacid Combination as Corrosion Inhibitors in Antifreeze Formulations," *Worldwide Trends in Engine Coolants, Cooling System Materials and Testing*, SAE Int'l SP–811, Paper #900804, pp. 135–151 (1990).
Ford Engineering Material Specifications, "Coolant, Organic Additive Technology, Concentrate, For Passenger Car And Light Truck," Specification No. WSS–M97B44–D and –D1 (1995).
Hudgens et. al., "Test Methods for the Development of Supplemental Additives for Heavy–Duty Diesel Engine Coolants," Engine Coolant Testing: Second Volume, ASTM STP 887, R.E. Beal, Ed. ASTM, Philadelphia, pp 189–215 (1986).
Nalco, "Cooling System Corrosion," Technifax TF–159 (1988).
B. D. Oakes, "Observations on Aluminum Water Pump Cavitation Tests," Second Symposium on Engine Coolants, ASTM STP 887, pp. 231–248 (1986).
D. E. Turcotte, "Engine Coolant Technology, Performance and Life for Light Duty Applications," Fourth Symposium on Engine Coolants (1997).
"Vital Signs," *Ward's Auto World*, p. 22 (Sep. 1996).
Westvaco brochure, "Westvaco Diacid M–T67, Description and Typical Applications", prior to Aug. 19, 1998.
Winter et al., "The Story Behind the Numbers," *Ward's 1996 Automotive Yearbook*, pp. 24–30 (58th ed. 1996).

*Primary Examiner*—Elizabeth McKane
(74) *Attorney, Agent, or Firm*—Fish & Neave

(57) ABSTRACT

This invention relates to antifreeze compositions comprising a mixture of organic acid corrosion inhibitors. The compositions comprise (a) from about 90% to about 99.89% by weight of a liquid alcohol which functions as a freezing point depressant, or mixture thereof; (b) from about 0.1% to about 5.5% by weight of a carboxylic acid selected from the group consisting of saturated and unsaturated aliphatic, and aromatic, mono-, di- and tri-carboxylic acids, and salts and isomers thereof, and any mixture thereof, and (c) from about 0.1% to about 2% by weight of a cyclohexenoic acid, or salt, isomer or mixture thereof, having the formula:

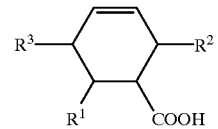

wherein each of $R^1$, $R^2$ and $R^3$ is, independently, selected from the group consisting of H, OH, COOH, $C_1$–$C_{10}$ alkyl groups, glycol esters, or combinations thereof. The antifreeze compositions provide surprisingly improved corrosion protection to aluminum surfaces, and in particular protection from cavitation-erosion corrosion, as compared to compositions containing only the carboxylic acid component or the cyclohexenoic acid component alone.

50 Claims, No Drawings

ANTIFREEZE COMPOSITIONS COMPRISING CARBOXYLIC ACID AND CYCLOHEXENOIC ACID

FIELD OF THE INVENTION

The present invention relates generally to organic acid corrosion inhibitors for antifreeze compositions. More particularly, the present invention relates to mixtures comprising a carboxylic acid, or salt, isomer or mixture thereof, and a cyclohexenoic acid, or salt, isomer or mixture thereof, for use in antifreeze compositions as corrosion inhibitors to provide prolonged corrosion protection to the aluminum metal surfaces in cooling and/or heating systems, such as those found in internal combustion engines.

BACKGROUND OF THE INVENTION

Corrosion has long been a problem when certain metals or alloys are used in applications in which they come into contact with an aqueous medium. For example, in heat-transfer systems, such as those found in internal combustion engines, alcohol-based heat transfer fluids (i.e., antifreezes) can be very corrosive to the metal surfaces of the heat-transfer systems. Compounding this problem is the fact that the corrosion is accelerated under normal engine operating conditions (i.e., high temperatures and pressures).

Aluminum surfaces, are particularly susceptible to corrosion. See Darden et al., "Monobasic/Diacid Combination as Corrosion Inhibitors in Antifreeze Formulations," *Worldwide Trends in Engine Coolants, Cooling System Materials and Testing*, SAE Int'l SP-811, Paper #900804, pp. 135–51 (1990) ("SAE SP-811").

Indeed, aluminum surfaces are susceptible to several types of corrosion including general corrosion, pitting and crevice corrosion as well as cavitation-erosion corrosion. These types of corrosion, however, typically occur under different conditions and thus, affect different types of aluminum surfaces. For example, general corrosion usually occurs on aluminum surfaces which are readily susceptible to corrosion because they are poorly inhibited or because they are subject to "heat-rejecting" conditions (e.g., cylinder heads) or "heat-accepting" conditions (e.g., radiators and heater cores).

Pitting/crevice corrosion usually occurs on the thin aluminum sheets used in radiators or heater cores. Such corrosion generally results from localized penetration of the oxide film which would otherwise cover and protect the aluminum surfaces. See SAE SP-811.

Cavitation-erosion corrosion ("CE-type" corrosion), like pitting/crevice corrosion, attacks the protective oxide film which can result from implosion of bubbles on the aluminum surfaces. See SAE SP-811 at p. 136. CE-type corrosion can be accelerated by the formation of foam in the cooling system. Foam results from air bubbles which are entrapped and agitated in the cooling system. See, e.g., Nalco, "Cooling System Liner/Water Pump Pitting," Technifax TF-159 (1988). Thus, aluminum water pumps, which are used to circulate antifreeze coolants throughout a vehicle's cooling and/or heating systems, are particularly susceptible to CE-type corrosion. This is so because bubbles are readily formed on the trailing sides of the water pump impeller blades due to locally reduced pressure and consequent boiling caused by the high rotation rate. When these bubbles collapse in higher pressure areas in the water pump, they can erode the metal in these areas. This process can eventually destroy the impeller causing loss of pumping performance and/or can perforate the pump body leading to loss of engine coolant. See, e.g., Oakes, "Observation on Aluminum Water Pump Cavitation Tests," Second Symposium on Engine Coolants, ASTM STP 887, pp. 231–48 (1986).

The corrosion of aluminum surfaces has become a significant concern in the automotive industry because of the increasing use of such lightweight materials. See, e.g., *Ward's Auto World*, p. 22 (September, 1996); *Ward's 1996 Automotive Yearbook*, p. 27 (58th ed. 1996). For example, heat exchangers in cars and light duty trucks are now being constructed using aluminum components including the water pumps. See Hudgens et al., "Test Methods for the Development of Supplemental Additives for Heavy-Duty Diesel Engine Coolants," Engine Coolant Testing: Second Volume, ASTM STP 887, Beal, Ed., ASTM, Philadelphia, 1986, pp. 189–215; Oakes "Observations on Aluminum Water Pump Cavitation Tests," Engine Coolant Testing: Second Volume, ASTM STP 887, Beal, Ed., ASTM, Philadelphia, 1986, pp. 231–248; Beynon et al., "Cooling System Corrosion in Relation to Design and Materials," Engine Coolant Testing: State of the Art, ASTM STP 705, Ailor, Ed., ASTM, Philadelphia, 1980, pp. 310–326. In particular, CE-type corrosion has become a significant concern because, aside from mechanical seal failures caused by high thermal stresses and inadequate lubrication, CE-type corrosion is one of the leading causes of water pump failures. See, e.g., Beynon, supra at pp. 310–326 (1980).

In general, corrosion inhibitors have been used to protect the metal surfaces used in heat transfer systems. For example, triazoles, thiazoles, borates, silicates, phosphates, benzoates, nitrates, nitrites and molybdates have been used in antifreeze formulations. See, e.g., U.S. Pat. No. 4,873, 011; see also, SAE SP-811 at pp. 135–138, 145–46. However, such corrosion inhibitors have several problems, including expense, and inadequate long-term protection. See U.S. Pat. No. 4,946,616, col. 1, lines 31–45; U.S. Pat. No. 4,588,513, col. 1, lines 55–64; SAE SP-811, pp. 137–38. Accordingly, automobile manufacturers have begun using, and several now require, organic acid based (or extended life) corrosion inhibitors such as mono- and/or di-carboxylic acids. A number of carboxylic acid corrosion inhibitors have been described. See, e.g., U.S. Pat. Nos. 4,382,008, 4,448, 702 and 4,946,616; see also U.S. Pat. No. 5,741,436, incorporated herein by reference.

However, carboxylic acid corrosion inhibitors, while effective at protecting against general and pitting/crevice types of aluminum corrosion, are generally ineffective as CE-type corrosion inhibitors. See, e.g., D. E. Turcotte, "Engine Coolant Technology, Performance and Life for Light Duty Application," Fourth Symposium on Engine Coolants (1997). Indeed, many of the known aluminum corrosion inhibitors, while effective at protecting against one or more types of aluminum corrosion, are generally not known to be effective at inhibiting all types of aluminum corrosion. For example, silicates and phosphate salts known to be effective at inhibiting general corrosion and CE-type corrosion, are not known to inhibit pitting/crevice corrosion. Also, nitrates which are known to be effective pitting/crevice corrosion inhibitors, are not known to inhibit general or CE-type corrosion. Certain carboxylic acid based compositions comprising polymerizable-acid graft polymers useful as cavitation-erosion corrosion inhibitors are also disclosed in co-pending U.S. patent application Ser. No. 08/999,098, filed Dec. 29, 1997, and incorporated by reference herein.

Certain cyclohexenoic acids are known and used primarily in the preparation of water-soluble surfactants. See, e.g., U.S. Pat. Nos. 3,931,029 and 4,476,055. Other cyclohexenoic acids have been used as corrosion inhibitors in metal working applications and as corrosion inhibitors in antifreeze compositions for inhibiting the corrosion of metals other than aluminum (e.g., solder alloys). See, e.g., U.S. Pat. No. 3,931,029. However, such corrosion inhibitors were not known to be effective as aluminum corrosion inhibitors and in particular, CE-type corrosion inhibitors.

Thus, there remains a need for a composition which provides improved CE-type corrosion inhibition of aluminum surfaces and which provides acceptable overall corrosion inhibition of aluminum surfaces.

SUMMARY OF THE INVENTION

The present invention provides antifreeze concentrates comprising:

(a) from about 90% to about 99.89% by weight of a liquid alcohol which functions as a freezing point depressant, or mixture thereof;

(b) from about 0.1% to about 5.5% by weight of a carboxylic acid selected from the group consisting of saturated and unsaturated aliphatic, and aromatic, mono-, di- and tri-carboxylic acids, and salts and isomers thereof, and any mixture thereof; and (c) from about 0.01% to about 2% by weight of a cyclohexenoic acid, or salt, isomer or mixture thereof, having the formula:

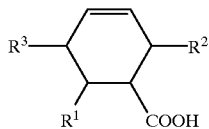

wherein each of $R^1$, $R^2$ and $R^3$ is independently selected from the group consisting of H, OH, COOH, $C_1$–$C_{10}$ alkyl groups, glycol esters, or combinations thereof The inventive concentrates have been found to be surprisingly effective exhibiting reduced corrosion of aluminum surfaces, especially CE-type corrosion. The present invention also provides antifreeze formulations comprising the inventive concentrates and methods of inhibiting such corrosion using the inventive concentrates.

DETAILED DESCRIPTION OF THE INVENTION

In order that this invention may be more fully understood, the following detailed description is set forth.

The present invention provides antifreeze compositions which demonstrate surprisingly increased inhibition of aluminum surfaces and in particular, increased inhibition of CE-type corrosion of aluminum surfaces. Antifreeze compositions refer to antifreeze concentrates and antifreeze formulations which comprise a concentrate diluted with water.

The inventive antifreeze concentrates comprise:

(a) from about 90% to about 99.89% by weight of a liquid alcohol which functions as a freezing point depressant, or mixture thereof;

(b) from about 0.1% to about 5.5% by weight of a carboxylic acid selected from the group consisting of saturated and unsaturated aliphatic, and aromatic, mono-, di- and tri-carboxylic acids, and salts and isomers thereof, and any mixture thereof; and (c) from about 0.01% to about 2% by weight of a cyclohexenoic acid, or salt, isomer or mixture thereof, having the formula:

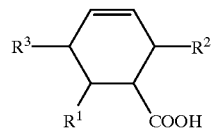

wherein each of $R^1$, $R^2$ and $R^3$ is independently selected from the group consisting of H, OH, COOH, $C_1$–$C_{10}$ alkyl groups, glycol esters, or combinations thereof.

Suitable liquid alcohols which function as freezing point depressants include any alcohol or other heat transfer medium and preferably is at least one alcohol, selected from the group consisting of methanol, ethanol, propanol, ethylene glycol, diethylene glycol, triethylene glycol, propylene glycol, dipropylene glycol, butylene glycol, glycerol, the monoethylether of glycerol, the dimethylether of glycerol, alkoxy alkanols (such as methoxyethanol) and mixtures thereof The preferred alcohol is selected from the group consisting of ethylene glycol, diethylene glycol, propylene glycol, dipropylene glycol and mixtures thereof.

The liquid alcohol component is added in the amount of from about 90% to about 99.89% by weight of the concentrate.

The carboxylic acid used in the antifreeze composition herein described may be selected from the group consisting of saturated and unsaturated aliphatic and aromatic mono-, di- and tri-carboxylic acids, and inorganic and organic salts (e.g., alkali and alkaline earth metal, ammonium and amine salts) and isomers thereof and any combination thereof. Preferred carboxylic acids include $C_4$–$C_{12}$ mono- or di-carboxylic acids such as 2-ethyl hexanoic acid, neodecanoic acid, neodecanoic acid, benzoic acid, t-butylbenzoic acid, dodecanedioic acid and sebacic acid, or salts (e.g., alkali and alkaline earth metal, ammonium or amine salts), isomers or mixtures thereof More preferred carboxylic acids include $C_8$ mono-carboxylic acids (e.g., 2-ethyl hexanoic acid) as well as mixtures having a major amount of a $C_8$ mono-carboxylic acid component (e.g., neo-octanoic acid and/or 2-ethyl hexanoic acid, more preferably 2-ethyl hexanoic acid) and neodecanoic acid, or salts (e.g., alkali and alkaline earth metal, ammonium or amine salts) or isomers thereof. Where the mixture of a $C_8$ mono-carboxylic acid component and neodecanoic acid is used, the preferred mixture comprises the $C_8$ mono-carboxylic acid component and neodecanoic acid in the weight ratio of about 3:1 See U.S. Pat. No. 5,741,436, incorporated herein by reference.

The carboxylic acid component is added in an amount of from about 0.1% to about 5.5% by weight of the concentrate, preferably from about 1% to about 5%, and more preferably from about 2% to about 4% by weight.

The cyclohexenoic acid component has the structure:

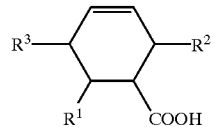

wherein each of $R^1$, $R^2$ and $R^3$ is, independently, selected from the group consisting of H, OH, COOH, $C_1$–$C_{10}$ alkyl groups, glycol esters, or combinations thereof
Where the substituents comprise a $C_1$–$C_{10}$ alkyl group, more preferred alkyl groups have up to six carbon atoms because such groups are believed to result in cyclohexenoic acids having improved miscibility in the antifreeze composition.

For the cyclohexenoic acid component, $R^1$ is preferably H or COOH (with COOH more preferred), $R^3$ preferably comprises a $C_1$–$C_{10}$ alkyl group, and $R^2$ preferably has the structure:

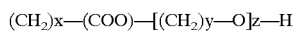

wherein:
x is from 0 to 10;
y is from 1 to 5; and
z is from 0 to 5.

Preferably, z is 0–2, more preferably z is 1 or 2, and even more preferably z is 2. Examples of useful cyclohexenoic acids include:

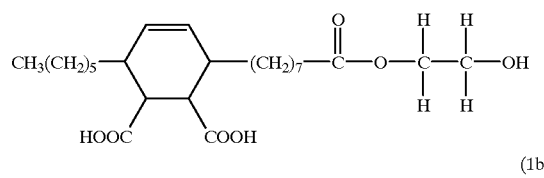

(1a)

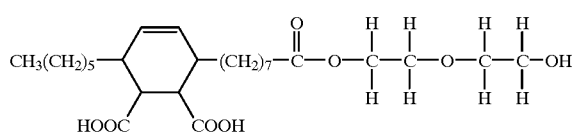

(1b)

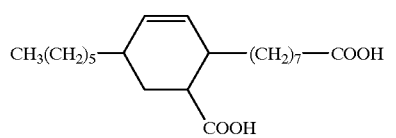

(1c)

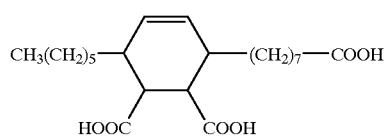

(1d)

The cyclohexenoic acid component is added in an amount of from about 0.01% to about 2.0% by weight of the concentrate. The only expected constraint is the miscibility of the cyclohexenoic acid (or its salt) component in the concentrate. Preferably, the cyclohexenoic acid component is added in an amount 15 of from about 0.01% to about 1.0%, more preferably from about 0.1% to about 1.0%, and even more preferably from about 0.1% to about 0.3% by weight of the concentrate.

The cyclohexenoic acids used in this invention, including those specifically described above, may be obtained from Westvaco Corporation.

The acid components of the antifreeze compositions of this invention may alternatively be in the form of an alkali metal salt, ammonium salt or amine salt. Preferred salts are the alkali metal salts, and most preferred are sodium or potassium salts of the acids.

The antifreeze compositions may also include one or more additional corrosion inhibitors, such as triazoles, thiazoles, phosphates, borates, silicates, molybdates, nitrates, nitrites or the alkali metal, alkaline earth metal, ammonium or amine salts thereof In some applications, for example heavy duty engine applications, the antifreeze compositions of this invention further comprise nitrite. Preferably, the antifreeze compositions of this invention further comprise a triazole or thiazole, more preferably, an aromatic triazole or thiazole such as benzotriazole ("BZT"), mercaptobenzothiazole ("MBT") or tolyltriazole ("TTZ") and most preferably, TTZ. Such additional corrosion inhibitors may be added in concentrations of up to about 5.5% (by weight of the antifreeze composition).

The antifreeze composition may also comprise a sufficient amount of an alkali metal hydroxide to adjust the pH to between about 6.0 to about 11.0, preferably to about 6.5 to about 9.0. Other additives may also be used depending on the application. Suitable additives include dyes (e.g., "Alizarine Green," "Uranine Yellow" or "Green AGS-liquid" from Abbey Color Inc., "Orange II (Acid Orange 7)" or "Intracid Rhodamine WT (Acid Red 388)" from Crompton & Knowles Corp.), odor masking aids, perfumes, bitterants, antifoams, rust inhibitors, pH buffers, scale inhibitors, and/or sequestration and dispersion agents (e.g., "Dequest" from Monsanto Chemical Company, "Bayhibit" from Miles Inc., "Rejext-it" from PMC Specialties Group, "Nalco" or "NalPREP" from Nalco Chemical Company).

The antifreeze concentrates of the present invention can be used to prepare antifreeze formulations. To form such an antifreeze formulation, the concentrate is diluted with water. Preferably, the antifreeze formulation comprises from about 10% to about 90% by weight water, and more preferably from about 25% to about 75% by weight water.

It will be appreciated by one of skill in the art that the amounts of the components of the antifreeze compositions may vary when minor adjustments are made to the other components of the compositions.

The present invention also provides methods for inhibiting corrosion of the aluminum components in internal combustion engines. Such methods comprise the step of contacting the aluminum components to be protected with the antifreeze compositions described above.

In order that this invention may be better understood, the following examples are set forth. These examples are for the purpose of illustration only and are not to be construed as limiting the scope of the invention in any way.

EXAMPLES

To evaluate the effectiveness of the above-described antifreeze compositions to inhibit corrosion of aluminum, a number of compositions were subjected to standard industry corrosion tests. In the compositions tested, the following representative cyclohexenoic acid compounds were used:

Compound I

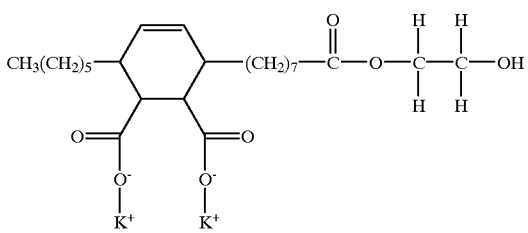

Compound II

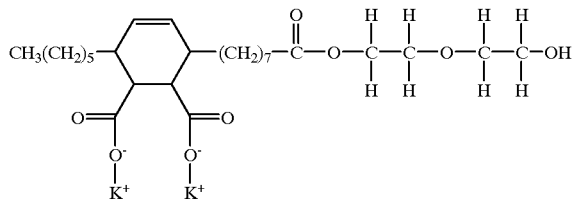

Compound III

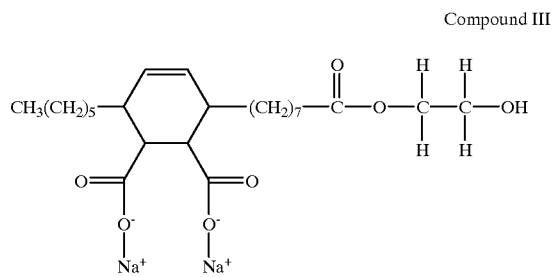

Compound IV

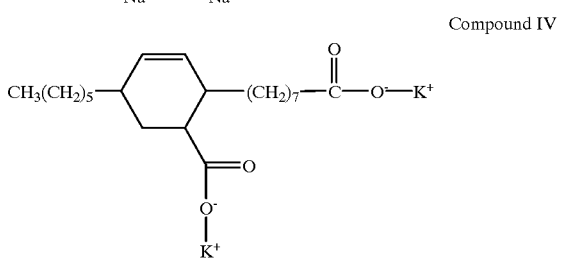

Compound V

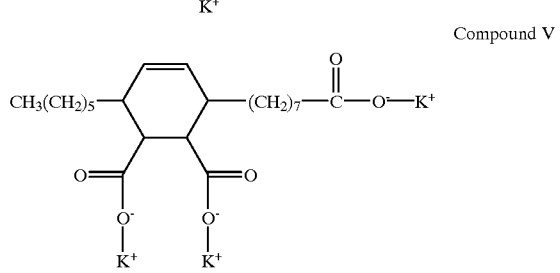

1. ASTM D2809—"Standard Test Method for Cavitation Corrosion and Erosion-Corrosion Characteristics of Aluminum Pumps with Engine Coolants"

Ten different antifreeze compositions were prepared and evaluated under the conditions set forth by ASTM D2809. See Annual Book of ASTM Standards, Section 15, Volume 15.05 (1996), incorporated herein by reference. ASTM D2809 is the standard test method for CE-type corrosion of aluminum pumps using antifreeze coolants. Before testing, each of the test solutions was diluted in accordance with ASTM D2809. These compositions were prepared in accordance with note #4 set forth in ASTM D2809.

After preparing the compositions and subjecting them to the test procedures set forth in ASTM D2809, the aluminum pump, casting/cover and impeller were visually inspected and rated on a scale of 1 to 10 according to the recommendations set forth in ASTM D2809. Under ASTM D3306, a rating of 8 (for each of the pump, casting/cover and impeller) is the minimum required to pass ASTM D2809, with 10 being perfect. The compositions and results are set forth in Tables 1a and 1b.

TABLE 1a

| Component (wt %) | 1 (Control) | 2 (Control) | 3 | 4 | 5 |
|---|---|---|---|---|---|
| Ethylene Glycol | 95.93 | 95.64 | 95.29 | 95.09 | 95.79 |
| 2-ethyl hexanoic acid | 2.0 | 2.0 | 2.0 | 2.0 | 2.0 |
| Sebacic acid | 0 | 0 | 0 | 0 | 0 |
| Compound I, 40 wt % sol. | 0 | 0 | 0.6 | 0.6 | 0 |
| Compound II, 40 wt % sol. | 0 | 0 | 0 | 0 | 0.6 |
| NaOH, 50 wt % sol. | 1.06 | 1.06 | 1.07 | 1.06 | 1.06 |
| NaTTZ, 50 wt % sol. | 0.5 | 0.5 | 0.5 | 0.5 | 0.5 |
| NaNO$_3$, 40 wt % sol. | 0.5 | 0.5 | 0.5 | 0.5 | 0 |
| Miscellaneous | 0.007[1] | 0.30[2] | 0.30[2] | 0.25[3] | 0.30[2] |
| pH | 9.10 | 9.33 | 9.08 | 9.06 | 8.95 |
| ASTM D2809 Ratings | | | | | |
| Pump | 6 | 7 | 10 | 10 | 9 |
| Impeller | 5 | 5 | 10 | 10 | 9 |
| Cover | 8 | 7 | 10 | 10 | 9 |

[1] Contains a PPG/alcohol based antifoaming agent.
[2] Contains antifoaming agent PI-35/50.
[3] Contains antifoaming agent S205 LF.

TABLE 1b

| Component (wt %) | 6[1] (Control) | 7[2] | 8[3] | 9[4] | 10[5] |
|---|---|---|---|---|---|
| Ethylene Glycol | >90 | >90 | >90 | 95.8 | 95.8 |
| 2-ethyl hexanoic acid | 2.74 | 2.74 | 3.9 | 0 | 0 |
| Sebacic acid | 0.23 | 0.23 | 0.25 | 0 | 0 |
| Compound I, 40 wt % sol. | 0 | 0.3 | 0 | 0 | 0.6 |
| Compound II, 40 wt % sol. | 0 | 0 | 0 | 0 | 0 |
| NaOH | 0 | 0 | 0 | 0.20 | 0.20 |
| NaTTZ, 50 wt % sol. | 0.6 | 0.6 | 0.51 | 0.20 | 0.20 |
| NaNO$_3$, 40 wt % sol. | 0 | 0 | 0 | 0.20 | 0.20 |
| NaNO$_2$ | 0 | 0 | 1.0 | 0 | 0 |
| Miscellaneous | >0 | >0 | >0 | 3.63–3.64[6] | 3.63–3.64[6] |
| pH | 8.4–8.6 | 8.3 | 8.6 | 10.2 | 10.0 |
| ASTM D2809 Ratings | | | | | |
| Pump | 5 | 8 | 3 | 1 | 4 |
| Impeller | 5 | 8 | 1 | 1 | 1 |
| Cover | 7 | 8 | 1 | 2 | 6 |

[1] This is a Texaco commercial formulation identified as Dex Cool ®.
[2] This is a combination of Dex Cool ® antifreeze and Compound I.
[3] This is a commercial formulation for heavy duty vehicles known as Caterpillar EC-1
[4] This is a General Motors standard formulation known as GM-6038M.
[5] This comprises a General Motors standard formulation known as GM-6038M as well as Compound I.
[6] Contains sodium tetraborate (1.0%), sodium metasilicate (0.15%) and sodium orthophosphate (0.45%), as well as dyes and antifoaming agents consistent with GM-6038.

As shown in Tables 1a and 1b, the control compositions (Examples 1, 2 and 6) all failed ASTM D2809. Also, the composition (Example 8) further comprising nitrite, a known CE-type cast iron corrosion inhibitor, also failed ASTM D2809. However, the combination of a cyclohexenoic acid and a carboxylic acid significantly improved performance in all compositions (Examples 3–5 and 7) and resulted in an antifreeze composition that consistently passed ASTM D2809).

2. Ford Water Pump Test

Four different antifreeze compositions were prepared and evaluated under the conditions set forth by Ford Motor Company Specification No. WSS-M97B44-D (at Table 2) ("the Ford Water Pump test"). The Ford Water Pump test is a standard water pump test similar to that specified by ASTM D2809. Like ASTM D2809, the Ford test requires a visual inspection of the aluminum pump and casting/cover (but not the impeller) and rated on a scale of 1 to 10 according to the recommendations set forth in ASTM D2809.

The Ford test, however, evaluates the effectiveness of an antifreeze composition as a CE-type corrosion inhibitor using a specified Ford water pump (unlike ASTM D2809 which requires a specified General Motors water pump). Also, the Ford test requires an inspection at 100, 300 and 1000 hours and a reporting of the ratings at each interval (unlike ASTM D2809 which only requires a 100 hour inspection with a minimum rating of 8). The compositions tested and the results are set forth in Table 2 below.

TABLE 2

| Component (wt %) | 11 (Control) | 12 | 13 (Control) | 14 |
|---|---|---|---|---|
| Ethylene Glycol | >95 | >95 | 93.28 | 93.39 |
| 2-ethyl hexanoic acid | 0 | 0 | 3.3 | 3.0 |
| Sebacic acid | 2.0 | 2.0 | 0 | 0 |
| Neo-decanoic acid | 0 | 0 | 1.1 | 1.0 |
| Compound I, 40 wt % sol. | 0 | 0.3 | 0 | 0.3 |
| NaOH, 50 wt % sol. | 1.52 | 1.53 | 2.2 | 2.0 |
| NaTTZ, 50 wt % sol. | 0.2 | 0.2 | 0.1 | 0.2 |
| $NaNO_3$, 40 wt % sol. | 0.5 | 0.5 | 0 | 0 |
| Miscellaneous | 0.018[1] | 0.311[2] | 0.018[3] | 0.111[4] |
| pH | 8.5 | 8.5 | 8.7 | 8.65 |
| Ford Water Pump Ratings (100 hrs) | | | | |
| Pump | 8 | 10 | 10 | 10 |
| Cover | 8 | 10 | 10 | 10 |
| Ford Water Pump Ratings (300 hrs) | | | | |
| Pump | 6 | 10 | 10 | 10 |
| Cover | 6 | 10 | 10 | 10 |
| Ford Water Pump Ratings (1000 hrs) | | | | |
| Pump | — | 8 | — | 8 |
| Casting | — | 8 | — | 7 |

[1]Includes dyes Intracid Orange II (0.01%) and Intracid Rhodamine WT (0.001%), as well as a PPG/alcohol based antifoaming agent (0.007%).
[2]Includes dyes Intracid Orange II (0.01%) and Intracid Rhodamine WT (0.001%), as well as antifoaming agent Foam Ban 3529c (0.3%).
[3]Includes Intracid Orange II (0.01%) and Intracid Rhodamine WT (0.001%), as well as a PPG/alcohol based antifoaming agent (0.007%).
[4]Includes Intracid Orange II (0.01%) and Intracid Rhodamine WT (0.001%), as well as a PPG/alcohol based antifoaming agent S205 LF (0.1%).

As shown in Table 2, the control compositions (Examples 11 and 13) did not complete the 1000 hour test. In each of the control compositions, perforation of the water pump occurred at 494 and 831 hours, respectively. However, the use of a combination of a carboxylic acid component and a cyclohexenoic acid component allowed the composition to complete the 1000 hour test and significantly improved performance in both compositions (Examples 12 and 14).

3. ASTM D1384—"Standard Test Method for Corrosion Test for Engine Coolants in Glassware"

Twenty-two different antifreeze compositions were prepared and evaluated under the conditions set forth by ASTM D1384. See Annual Book of ASTM Standards, Section 15, Volume 15.05 (1996), incorporated herein by reference. ASTM D1384 is a standard test method for general corrosion of a variety of metals typically found in the cooling and/or heating systems of internal combustion engines.

Before testing, each of the solutions was diluted with "corrosive water" (deionized water containing 100 ppm each of deionized water containing 100 ppm each of $SO_4^{2-}$, $HCO_3^-$ and $Cl^-$, all added as Na salts) to make a formulation with 33.3% (by volume) concentrate. These compositions were prepared in accordance with the "Treatment of Mixtures" prescribed by ASTM D1176.

After preparing the compositions and subjecting them to the test procedures set forth in ASTM D1384 (the metal specimens were immersed for 336 hours in the antifreeze composition and maintained at a temperature of 88° C.), the weight change of the metal specimens were measured (average of triplicate specimens). In addition to the metal specimens required by ASTM D1384, a modine solder specimen was also tested.

A negative weight loss signifies a weight increase due to the formation of a protective coating on the metal surfaces. The reproducibility error associated with this test is about +/−5 mg for aluminum. Under ASTM D3306, an aluminum weight loss of 30.0 mg is the maximum allowed to pass ASTM D1384.

TABLE 3a

| Component (wt %) | 15 | 16 (Control) | 17 (Control) | 18 | 19 |
|---|---|---|---|---|---|
| Ethylene Glycol | 97.49 | 96.44 | 96.40 | 95.79 | 95.79 |
| 2-ethyl hexanoic acid | 0 | 2.0 | 2.0 | 2.0 | 2.0 |
| Compound I, 40 wt % sol. | 0 | 0 | 0 | 0.6 | 0 |
| Compound II, 40 wt % sol. | 0 | 0 | 0 | 0 | 0.6 |
| Compound IV, 40 wt % sol. | 2.0 | 0 | 0 | 0 | 0 |
| Compound V, 40 wt % sol. | 0 | 0 | 0 | 0 | 0 |
| NaOH, 50 wt % sol. | 0.0004 | 1.06 | 1.06 | 1.06 | 1.06 |
| NaTTZ, 50 wt % sol. | 0.5 | 0.5 | 0.5 | 0.5 | 0.5 |
| $NaNO_3$, 40 wt % sol. | 0 | 0 | 0 | 0 | 0 |
| Miscellaneous | 0.01[1] | 0.0 | 0.04[2] | 0.04[2] | 0.04[2] |
| pH | 9.23 | 9.02 | 9.19 | 9.04 | 9.04 |
| ASTM D1384 (mg loss) | | | | | |
| Aluminum | 36.0 | 11.2 | 8.4 | 0.3 | 0.0 |
| Modine Solder | 25.8 | 273.6 | 221 | 88.5 | 65 |
| Copper | 1.1 | 0.3 | 1.3 | 1.2 | 1.3 |
| Sn30a Solder | 3.0 | 0.3 | −0.1 | −0.3 | 0.1 |
| Brass | 1.0 | 0.6 | 1.4 | 1.3 | 1.3 |
| Steel | −0.3 | −0.3 | 0.9 | 0.5 | 0.4 |
| Iron | 40.0 | −3.4 | −1.8 | −1.0 | −1.3 |

[1]Contains antifoaming agent Pluronic L61.
[2]Contains antifoaming agent PI-35/50.

TABLE 3b

| Component (wt %) | Example No. | | | | |
| --- | --- | --- | --- | --- | --- |
| | 20 | 21 | 22 | 23 | 24 |
| Ethylene Glycol | 95.79 | 94.40 | 95.79 | 95.03 | 95.03 |
| 2-ethyl hexanoic acid | 2.0 | 2.0 | 2.0 | 2.0 | 2.0 |
| Compound I, 40 wt % sol. | 0 | 0 | 0 | 0.6 | 0 |
| Compound II, 40 wt % sol. | 0 | 0 | 0 | 0 | 0.6 |
| Compound IV, 40 wt % sol. | 0.6 | 2.0 | 0 | 0 | 0 |
| Compound V, 40 wt % sol. | 0 | 0 | 0.6 | 0 | 0 |
| NaOH, 50 wt % sol. | 1.06 | 1.10 | 1.06 | 1.07 | 1.07 |
| NaTTZ, 50 wt % sol. | 0.5 | 0.5 | 0.5 | 0.5 | 0.5 |
| NaNO$_3$, 40 wt % sol. | 0 | 0 | 0 | 0.5 | 0.5 |
| Miscellaneous | 0.04[1] | 0.0 | 0.04[1] | 0.3[1] | 0.3[1] |
| pH | 9.04 | 9.06 | 9.22 | 9.00 | 9.27 |
| ASTM D1384 (mg loss) | | | | | |
| Aluminum | −0.5 | −4.7 | 3.5 | −2.7 | −2.0 |
| Modine Solder | 195 | 261.9 | 144 | 108 | 158 |
| Copper | 1.4 | 0.8 | 1.8 | 0.8 | 0.7 |
| Sn30a Solder | 3.6 | 3.2 | −1.1 | 5.9 | 6.5 |
| Brass | 1.1 | 1.1 | 1.4 | 1.0 | 1.0 |
| Steel | 0.3 | 0.0 | 0.4 | 0.3 | 0.3 |
| Iron | −1.0 | −2.8 | −1.2 | −0.9 | −1.3 |

[1]Contains antifoaming agent PI-35/50.

TABLE 3c

| Component (wt %) | Example No. | | | |
| --- | --- | --- | --- | --- |
| | 25 | 26 | 27 | 28 |
| Ethylene Glycol | 94.34 | 93.79 | 92.71 | 92.59 |
| 2-ethyl hexanoic acid | 3.1 | 3.2 | 3.1 | 3.3 |
| Neo-decanoic acid | 0 | 0 | 0 | 1.1 |
| Compound I, 40 wt % sol. | 0 | 0 | 0 | 0.3 |
| Compound IV, 40 wt % sol. | 0 | 0.8 | 1.9 | 0 |
| NaOH, 50 wt % sol. | 2.03 | 1.71 | 1.77 | 2.2 |
| NaTTZ, 50 wt % sol. | 0.5 | 0.5 | 0.5 | 0.2 |
| Miscellaneous | 0.03[1] | 0.0 | 0.02[1] | 0.31[2] |
| pH | 9.7 | 9.07 | 9.03 | 9.00 |
| ASTM D1384 (mg loss) | | | | |
| Aluminum | 8.1 | 7.2 | 6.3 | −1.2 |
| Modine Solder | 234.7 | 113.6 | −117.7 | 134 |
| Copper | 0.8 | 1.3 | 1.2 | 0.6 |
| Sn30a Solder | 0.5 | 3.0 | 0.9 | 5.1 |
| Brass | 1.5 | 1.2 | 1.5 | 1.1 |
| Steel | 0.2 | −0.3 | −0.1 | −0.1 |
| Iron | −5.4 | −3.4 | −4.0 | −1.0 |

[1]Contains antifoaming agent Pluronic L61 (0.01%).
[2]Contains antifoaming agent PI-35/50.

TABLE 3d

| Component (wt %) | Example No. | | | |
| --- | --- | --- | --- | --- |
| | 29 | 30 | 31 | 32 |
| Ethylene Glycol | >95 | >95 | >95 | >95 |
| Sebacic acid | 2.0 | 2.0 | 2.0 | 1.325 |
| Compound I, 40 wt % sol. | 0 | 0.3 | 0.3 | 0.3 |
| NaOH, 50 wt % sol. | 1.52 | 1.53 | 1.52 | 1.43 |
| NaTTZ, 50 wt % sol. | 0.2 | 0.2 | 0.2 | 0.2 |
| NaNO$_3$, 40 wt % sol. | 0.5 | 0.5 | 0.5 | 0.5 |
| Miscellaneous | 0.018[1] | 0.311[2] | 0.422[3] | 0.311[2] |
| pH | 8.5 | 8.5 | 8.5 | 8.9 |
| ASTM D1384 (mg loss) | | | | |
| Aluminum | 12.0 | −2.9 | −2.0 | −2.9 |
| Modine Solder | 16.0 | 175.1 | 56.1 | 180.9 |
| Copper | 1.0 | −0.1 | −0.3 | 0.9 |
| Sn30a Solder | 7.0 | −0.5 | −1.6 | −0.6 |
| Brass | 2.0 | −0.1 | −1.6 | 0.6 |
| Steel | 0 | 1.1 | 0.1 | 0.4 |
| Iron | −3.0 | 4.1 | −0.8 | 26.3 |

[1]Contains dyes Intracid Orange II (0.01%) and Intracid Rhodamine WT (0.001%), as well as a PPG/alcohol based antifoaming agent (0.0067%).
[2]Contains dyes Intracid Orange II (0.01%) and Intracid Rhodamine WT (0.001%), as well as antifoaming agent Foam Ban 3529c (0.3%).
[3]Contains dyes Intracid Orange II (0.01%) and Intracid Rhodamine WT (0.001%), as well as antifoaming agent Olin S 205LF (0.1%).

As Tables 3a–3d show, the only composition that did not pass ASTM 1384 (i.e., exhibited an aluminum weight loss >30 mg) is that which comprises a cyclohexenoic acid without a carboxylic acid (Example 15).

The combination of a cyclohexenoic acid component and a carboxylic acid component demonstrated an improved (decreased) aluminum weight loss as compared to the corresponding control composition comprising a carboxylic acid without a cyclohexenoic acid. For example, the addition of Compounds I, II, IV or V to a mono-carboxylic acid (e.g., 2-ethyl hexanoic acid in Examples 18–24) significantly improved aluminum weight loss as compared to the control compositions (Examples 16 and 17). This result occurred using different amounts and different examples of the cyclohexenoic acid component.

Significant improvement was also achieved using relatively high amounts of a combination of a cyclohexenoic acid and a mixture of mono-carboxylic acids (e.g., Example 28). Further, at least numerically improved aluminum weight loss was achieved at even relatively high amounts of mono-carboxylic acid (e.g., Example 25 vs. 26–27).

Similarly, the addition of even a relatively small amount of a cyclohexenoic acid to different amounts of a di-carboxylic acid (e.g., sebacic acid) significantly improved aluminum weight loss (Example 29 vs. 30–32).

Examples 29 and 30 were also evaluated under ASTM D1384 after being subjected to an accelerated aging test (Examples 29a and 30a, respectively). In this test, metal shavings were immersed for 336 hours in the antifreeze composition and maintained at 100° C. (each test is conducted in triplicate). The resulting compositions were then subjected to the test procedures set forth in ASTM D1384.

As Table 3e below shows, the combination of a carboxylic acid component and a cyclohexenoic acid component (Example 30a) provided excellent aluminum protection. While the addition of a cyclohexenoic acid to a carboxylic acid (Example 30a) demonstrated the same corrosion rate (−2.0) as the control composition (Example 29a), the control composition already provided excellent aluminum protection and as such, no conclusions can be made regarding improved results in a spent composition. However, the significant improvement in corrosion rate (i.e., decreased rate) by the addition of a cyclohexenoic acid to a carboxylic acid based antifreeze composition was demonstrated above.

TABLE 3e

| Component (wt %) | Example No. 29a (Control) | 30a |
|---|---|---|
| Ethylene Glycol | >95% | >95% |
| Sebacic acid | 2.0 | 2.0 |
| Compound I, 40 wt % sol. | 0 | 0.3 |
| NaOH, 50 wt % sol. | 1.52 | 1.53 |
| NaTTZ, 50 wt % sol. | 0.2 | 0.2 |
| NaNO$_3$, 40 wt % sol. | 0.5 | 0.5 |
| Miscellaneous | 0.018[1] | 0.311[2] |
| ASTM D1384 (mg loss) | | |
| Aluminum | −2.0 | −2.0 |
| Modine Solder | 39.3 | 89 |
| Copper | 0.0 | 0.0 |
| Sn30a Solder | 0.0 | 0.0 |
| Brass | 1.0 | 0.0 |
| Steel | 0.0 | 0.0 |
| Iron | 1.0 | 4.0 |

[1]Contains dyes Intracid Orange II (0.01%) and Intracid Rhodamine WT (0.001%), as well as a PPG/alcohol based antifoaming agent (0.0067%).
[2]Contains dyes Intracid Orange II (0.01%) and Intracid Rhodamine WT (0.001%), as well as antifoaming agent Foam Ban 3529c (0.3%).

4. ASTM D2570—"Standard Method For Simulated Service Corrosion Testing Of Engine Coolant"

Nineteen different antifreeze compositions were prepared and evaluated under the conditions set forth by ASTM D2570. See Annual Book of ASTM Standards, Section 15, Volume 15.05 (1996), incorporated herein by reference. ASTM D2570 is a standard test method for aluminum corrosion under simulated service conditions using a brass radiator. In this test, an aluminum radiator was also used. The results should only be compared between Examples using the same type of radiator.

Before testing, each of the solutions was diluted with "corrosive water" (deionized water containing 100 ppm each of $SO_4^{2-}$, $HCO_3^-$ and $Cl^-$, all added as Na salts) to make a composition with 44% (by volume) concentrate. These compositions were prepared in accordance with the "Treatment of Mixtures" prescribed by ASTM D1176.

After preparing the compositions and subjecting them to the test procedures set forth in ASTM D2570 (the metal specimens were immersed for 1064 hours in the antifreeze composition and maintained at a temperature of 88° C.), the weight change of the metal specimens were measured (average of triplicate specimens). In addition to the metal specimens required by ASTM D2570, a modine solder specimen was also tested in certain compositions. A negative weight loss signifies a weight increase due to the formation of a protective coating on the metal surfaces. The error associated with this test is about +/−5 mg for aluminum. Under ASTM D3306, an aluminum weight loss of 60.0 mg is the maximum allowed to pass ASTM D2570.

TABLE 4a

ASTM 2570 using a brass radiator

| Component (wt %) | 33 (Control) | 34 | 35 | 36 | 37 | 38 |
|---|---|---|---|---|---|---|
| Ethylene Glycol | >90 | >90 | >90 | >90 | 95.79 | 95.79 |
| 2-ethyl hexanoic acid | 2.5 | 3.3 | 0 | 3.0 | 2.0 | 2.0 |
| Neo-decanoic acid | 0 | 1.1 | 0 | 0 | 0 | 0 |
| Sebacic acid | 0 | 0 | 2.0 | 0 | 0 | 0 |
| Compound I, 40 wt % sol. | 0 | 0 | 0 | 0 | 0.6 | 0 |
| Compound II, 40 wt % sol. | 0 | 0 | 0 | 0 | 0 | 0.6 |
| KOH, 45 wt % sol. | 2.10 | 0 | 0 | 2.52 | 0 | 0 |
| NaOH, 50 wt % sol. | 0 | 2.2 | 1.26 | 0 | 1.06 | 1.06 |
| NaTTZ, 50 wt % sol. | 0.2 | 0.2 | 0.2 | 0.2 | 0.5 | 0.5 |
| NaNO$_3$, 40 wt % sol. | 0 | 0 | 0.5 | 0 | 0 | 0 |
| Miscellaneous | 0.012[1] | 0.007[2] | 0.019[2] | 0.012[1] | 0.04[3] | 0.04[3] |
| pH | 9.0 | 9.00 | 8.5–9.0 | 8.9 | 9.04 | 9.04 |
| ASTM D2570 (mg loss) | | | | | | |
| Aluminum | 23.3 | 19.5 | 7.6 | 27.6 | 0.2 | −0.7 |
| Modine Solder | — | 130.4 | 290.3 | — | 10.9 | 9.0 |
| Copper | 7.7 | 4.1 | 5.4 | 20.5 | 15.5 | 38.5 |
| Sn30a Solder | 65.9 | −2.3 | 7.0 | 9.0 | 2.0 | 0.6 |
| Brass | 7.4 | 6.2 | 1.6 | 17.8 | 7.8 | 12.4 |
| Steel | −0.4 | 2.5 | 0.7 | 0.4 | 4.7 | 0.3 |
| Iron | −6.6 | −7.6 | −0.3 | −5.5 | −0.4 | −0.7 |

[1]Contains dye Orange Mix 3674 (0.005%) and a PPG/alcohol based antifoaming agent (0.007%).
[2]Contains dyes Intracid Orange II (0.01%) and Intracid Rhodamine WT (0.001%), as well as a PPG/alcohol based antifoaming agent (0.007%).
[3]Contains antifoaming agent PI-35/50.

TABLE 4b

ASTM 2570 using an aluminum radiator

| Component (wt %) | 39 Control | 40 Control | 41 Control | 42 Control | 43 | 44 | 45 | 46 | 47 | 48 | 49 | 50 | 51 |
|---|---|---|---|---|---|---|---|---|---|---|---|---|---|
| Ethylene Glycol | 96.14 | >90 | >90 | >90 | 95.03 | 95.03 | 92.59 | 95.09 | 95.04 | 95.09 | 95.04 | 95.04 | 95.04 |
| 2-ethyl hexanoic acid | 2.0 | 3.3 | 2.74 | 0 | 2.0 | 2.0 | 3.3 | 2.0 | 2.0 | 2.0 | 2.0 | | |
| Neo-octanoic acid | 0 | 0 | 0 | 0 | 0 | 0 | 0 | 0 | 0 | | | | 2.0 |
| Neo-decanoic acid | 0 | 1.1 | 0 | 0 | 0 | 0 | 1.1 | 0 | 0 | | | 2.0 | |
| Sebacic acid | 0 | 0 | 0.23 | 0 | 0 | 0 | 0 | 0 | 0 | | | | |
| Compound I, 40 wt % sol. | 0 | 0 | 0 | 0 | 0.6 | 0 | 0.3 | 0 | 0 | 0.6 | 0.6 | 0.6 | 0.6 |
| Compound II, 40 wt % sol. | 0 | 0 | 0 | 0 | 0 | 0.6 | 0 | 0 | 0 | | | | |
| Compound III, 40 wt % sol. | 0 | 0 | 0 | 0 | 0 | 0 | 0 | 0.6 | 0.6 | | | | |
| KOH, 45 wt % sol. | 0 | 0 | >0 | 0.5 | 0 | 0 | 0 | 0 | 0 | | | | |
| NaOH, 50 wt % sol. | 1.06 | 2.2 | 0 | 0.33 | 1.07 | 1.07 | 2.2 | 1.06 | 1.06 | 1.06 | 1.06 | 1.06 | 1.06 |
| NaTTZ, 50 wt % sol. | 0.5 | 0.2 | 0.6 | 0.05 | 0.5 | 0.5 | 0.2 | 0.5 | 0.5 | 0.5 | 0.5 | 0.5 | 0.5 |
| NaNO$_3$, 40 wt % sol. | 0 | 0 | 0 | 0 | 0.5 | 0.5 | 0 | 0.5 | 0.5 | 0.5 | 0.5 | 0.5 | 0.5 |
| Miscellaneous | 0.3[1] | 0.007[2] | >0[3] | 3.05[4] | 0.3[1] | 0.3[1] | 0.3[1] | 0.25[5] | 0.3[1] | 0.25[5] | 0.3[1] | 0.3[1] | 0.3[1] |
| pH | 8.82 | 9.00 | 8.4–8.6 | 8.0 | 9.00 | 9.27 | 9.00 | 9.04 | 9.04 | 9.06 | 9.25 | 9.91 | 9.02 |
| ASTM D2570 (mg loss) | | | | | | | | | | | | | |
| Aluminum | −1.5 | −1.8 | 2.5 | −0.1 | 2.0 | 0.3 | 0.8 | −2.9 | −0.7 | −4.0 | −1.8 | −1.2 | −0.3 |
| Modine Solder | 115.2 | 117.6 | 191.7 | — | 151 | 194 | 96.0 | 290.0 | 184.8 | 321.4 | 164.9 | 46.5 | 199.9 |
| Copper | 84.6 | 106.7 | 116.0 | 44.2 | 71.3 | 64.5 | 77.4 | 115.0 | 21.5 | 74.6 | 33.6 | 72.1 | 51.4 |
| Sn30a Solder | 8.5 | 3.5 | 4.4 | 2.7 | 3.5 | 6.9 | 5.9 | 6.5 | 15.0 | −7.6 | 3.5 | 4.3 | 6.7 |
| Brass | 3.8 | 15.0 | 4.4 | 12.9 | 18.9 | 16.7 | 86.4 | 81.0 | 19.0 | 53.3 | 11.7 | 39.9 | 22.6 |
| Steel | 1.0 | 10.2 | −0.6 | 0.7 | 0.0 | −0.5 | 0.1 | −0.5 | 0.5 | −0.5 | 0.4 | 0.2 | 0.5 |
| Iron | −1.5 | −5.2 | −6.8 | −1.5 | −0.5 | −6.0 | 1.3 | 1.2 | 0.3 | −0.2 | −0.5 | −3.3 | 1.0 |

[1]Contains antifoaming agent PI-35/50.
[2]Contains dyes Intracid Orange II (0.01%) and Intracid Rhodamine WT (0.001%), as well as a PPG/alcohol based antifoaming agent (0.007%).
[3]Contains antifoaming agent from Patco.
[4]Contains t-butylbenzoate (1.8%), benzoate (1.2%), sodium molybdate (41.1% sol.) (0.05%), dye and antifoam
[5]Contains antifoaming agent S-205LF.

As shown in Table 4a, the addition of a cyclohexenoic acid component (Examples 37–38) to a carboxylic acid component (Example 33) significantly improved (decreased) aluminum weight loss in the ASTM D2570 test using a brass radiator. Such a combination also provided superior aluminum protection as compared to compositions comprising a carboxylic acid component (e.g., mono-carboxylic, di-carboxylic and mixtures thereof) without the cyclohexenoic acid component (Examples 34–36).

As shown in Table 4b, in the ASTM D2570 test using an aluminum radiator the combination of a cyclohexenoic acid component and a carboxylic acid component provided excellent aluminum protection (Examples 43–51). While the addition of a cyclohexenoic acid component to a carboxylic acid component demonstrated about the same level of aluminum weight loss as the control compositions (Examples 39–42), the control compositions already provided excellent aluminum protection and as such, no conclusions can be made regarding improved results in an aluminum radiator. However, the significant improvement in aluminum weight loss (i.e., decreased loss) by the addition of a cyclohexenoic acid to a carboxylic acid based antifreeze composition was demonstrated above under ASTM D2570 conditions.

5. ASTM D4340—"Standard Test Method for Corrosion of Cast Aluminum Alloys in Engine Coolants Under Heat-Rejecting Conditions" (Aluminum Hot Surface Test)

The antifreeze compositions from Examples 29–30 were prepared and evaluated under the conditions set forth by ASTM D4340 (now Examples 52–53 respectively). See Annual Book of ASTM Standards, Section 15, Volume 15.05 (1996), incorporated herein by reference. ASTM D4340 is a standard test method for general corrosion of heat-rejecting aluminum found in the cooling and/or heating systems of internal combustion engines (e.g., aluminum cylinder heads). According to ASTM D3306, the maximum allowed corrosion rate resulting from a tested sample is 1.0 mg/cm$^2$/week. Because of fluctuations that may occur between runs with this test, the antifreeze composition to be evaluated should be run with a control composition at or about the same time.

TABLE 5

| | Example No. | |
|---|---|---|
| Component (wt %) | 52 (Control) | 53 |
| Ethylene Glycol | >95 | >95 |
| Sebacic acid | 2.0 | 2.0 |
| Compound I, 40 wt % sol. | 0 | 0.3 |
| NaOH, 50 wt % sol. | 1.52 | 1.52 |
| NaTTZ, 50 wt % sol. | 0.2 | 0.2 |
| NaNO$_3$, 40 wt % sol. | 0.5 | 0.5 |
| Miscellaneous | 0.018[1] | 0.311[2] |
| pH | 8.5 | 8.5 |
| ASTM D4340 (mg/cm$^2$/wk) | 0.64 | −0.072 |

[1]Contains dyes Intracid Orange II (0.01%) and Intracid Rhodamine WT (0.001%), as well as a PPG/alcohol based antifoaming agent (0.0067%).
[2]Contains dyes Intracid Orange II (0.01%) and Intracid Rhodamine WT (0.001%), as well as antifoaming agent Foam Ban 3529c (0.3%).

As shown in Table 5 above, the addition of a cyclohexenoic acid (Example 53) to the control composition (Example 52) resulted in a significantly lower corrosion rate of about 0 mg/cm$^2$/wk. This illustrates that the combination of acids of this invention provides not only improved corrosion protection to the aluminum components in water pumps, but also to aluminum cylinder heads.

I claim:

1. An antifreeze concentrate composition comprising:
   (a) from about 90% to about 99.89% by weight of a liquid alcohol which functions as a freezing point depressant, or mixture thereof;
   (b) from about 0.1% to about 5% by weight of a carboxylic acid, or salt, isomer or mixture thereof; and
   (c) from about 0.01% to about 2% by weight of a cyclohexenoic acid, or salt, isomer, or mixture thereof, having the following formula:

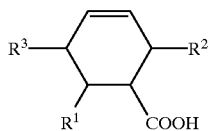

wherein $R^1$ is selected from the group consisting of OH, COOH, glycol esters, combinations thereof, and $C_1$–$C_{10}$ alkyl groups in combination with one or more of OH, COOH, or glycol ester;
   each of $R^2$ and $R^3$ is, independently, selected from the group consisting of H, OH, COOH, $C_1$–$C_{10}$ alkyl groups, glycol esters, and combinations thereof.

2. The antifreeze composition according to claim 1, wherein $R^1$ is COOH.

3. An antifreeze concentrate composition comprising:
   (a) from about 90% to about 99.89% by weight of a liquid alcohol which functions as a freezing point depressant, or mixture thereof;
   (b) from about 0.1% to about 5% by weight of a carboxylic acid, or salt, isomer or mixture thereof; and
   (c) from about 0.01% to about 2% by weight of a cyclohexenoic acid, or salt, isomer, or mixture thereof, having the following formula:

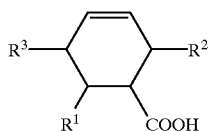

wherein each of $R^1$ and $R^2$ is, independently, a $C_1$–$C_{10}$ alkyl group; and
   $R^3$ is selected from the group consisting of H, OH, COOH, glycol esters, combinations thereof, $C_1$–$C_{10}$ alkyl groups, $C_1$–$C_{10}$ alkyl groups in combination with one or both of OH and glycol ester, $C_1$–$C_{10}$ alkyl groups in combination with both COOH and OH, $C_1$–$C_{10}$ alkyl groups in combination with both COOH and glycol ester, and $C_1$–$C_{10}$ alkyl groups in combination with COOH, OH, and glycol ester.

4. An antifreeze concentrate composition comprising:
   (a) from about 90% to about 99.89% by weight of a liquid alcohol which functions as a freezing point depressant, or mixture thereof;
   (b) from about 0.1% to about 5% by weight of a carboxylic acid, or salt, isomer or mixture thereof, and
   (c) from about 0.01% to about 2% by weight of a cyclohexenoic acid, or salt, isomer or mixture thereof having the following formula:

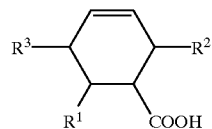

wherein $R^1$ is a $C_1$–$C_{10}$ alkyl group;
   $R^1$ is selected from the group consisting of OH, COOH, glycol esters, combinations thereof, and $C_1$–$C_{10}$ alkyl groups in combination with one or more of OH, COOH, or glycol ester; and
   $R^3$ is a $C_1$–$C_{10}$ alkyl group in combination with COOH.

5. An antifreeze concentrate composition comprising:
   (a) from about 90% to about 99.89% by weight of a liquid alcohol which functions as a freezing point depressant, or mixture thereof,
   (b) from about 0.1% to about 5% by weight of a carboxylic acid, or salt, isomer or mixture thereof, and
   (c) from about 0.01% to about 2% by weight of a cyclohexenoic acid, or salt, isomer, or mixture thereof, having the following formula:

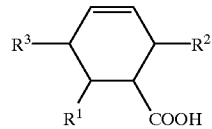

wherein $R^1$ is H;
   $R^1$ is selected from the group consisting of H, OH, COOH, $C_1$–$C_{10}$ alkyl groups, glycol esters, and combinations thereof,
   $R^3$ is selected from the group consisting of OH, COOH, glycol esters, combinations thereof, $C_1$–$C_{10}$ alkyl groups in combination with one or both of OH and glycol ester, $C_1$–$C_{10}$ alkyl groups in combination with both COOH and OH, $C_1$–$C_{10}$ alkyl groups in combination with both COOH and glycol ester, and $C_1$–$C_{10}$ alkyl groups in combination with COOH, OH, and glycol ester.

6. The antifreeze composition according to claim 5, wherein $R^3$ is selected from the group consisting of $C_1$–$C_{10}$ alkyl groups in combination with one or both of OH and glycol ester, $C_1$–$C_{10}$ alkyl groups in combination with both COOH and OH, $C_1$–$C_{10}$ alkyl groups in combination with both COOH and glycol ester, and $C_1$–$C_{10}$ alkyl groups in combination with COOH, OH, and glycol ester.

7. The antifreeze composition according to claim 6, wherein $R^2$ has the structure $(CH_2)x-(COO)-[(CH_2)y-O]z-H$, or salt or isomer thereof;
   where x is from 0 to 10;
   y is from 1 to 5; and
   z is from 0 to 5.

8. The antifreeze composition according to claim 7, wherein z is 0–2.

9. The antifreeze composition according to claim 7, wherein z is 1–2.

10. The antifreeze composition according to claim 7, wherein z is 2.

11. The antifreeze composition according to claim 7, wherein y is 2.

12. An antifreeze concentrate composition comprising:
    (a) from about 90% to about 99.89% by weight of a liquid alcohol which functions as a freezing point depressant, or mixture thereof;

(b) from about 0.1% to about 5% by weight of a carboxylic acid, or salt, isomer or mixture thereof; and (c) from about 0.01% to about 2% by weight of a cyclohexenoic acid, or salt, isomer, or mixture thereof, having the following formula:

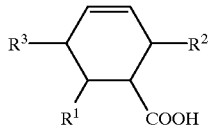

wherein $R^1$ is H;

$R^2$ is selected from the group consisting of OH, COOH, glycol esters, combinations thereof, $C_1$–$C_{10}$ alkyl groups in combination with one or both of OH and glycol ester, $C_1$–$C_{10}$ alkyl groups in combination with both COOH and OH, $C_1$–$C_{10}$ alkyl groups in combination with both COOH and glycol ester, and $C_1$–$C_{10}$ alkyl groups in combination with COOH, OH, and glycol ester;

$R^3$ is selected from the group consisting of H, OH, COOH, $C_1$–$C_{10}$ alkyl groups, glycol esters, and combinations thereof.

13. An antifreeze concentrate composition comprising:

(a) from about 90% to about 99.89% by weight of a liquid alcohol which functions as a freezing point depressant, or mixture thereof;

(b) from about 0.1% to about 5% by weight of a carboxylic acid, or salt, isomer or mixture thereof; and (c) from about 0.01% to about 2% by weight of a cyclohexenoic acid selected from the group consisting of:

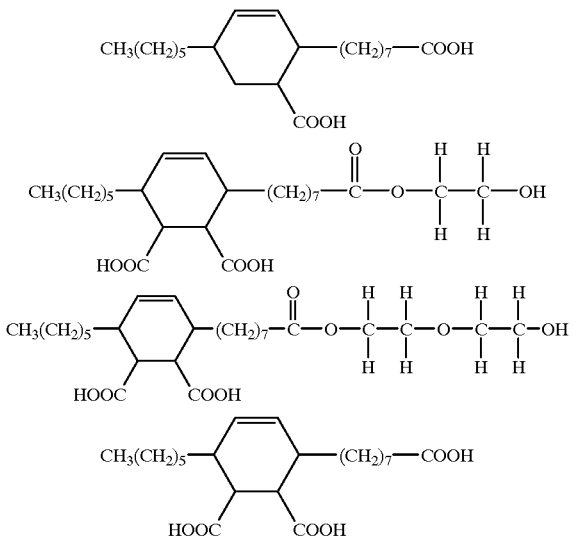

and salts, isomers and mixtures thereof.

14. The antifreeze concentrate composition according to claim 13, wherein said cyclohexenoic acid is

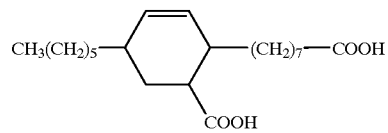

and salts and isomers thereof.

15. The antifreeze concentrate composition according to claim 13, wherein said cyclohexenoic acid is

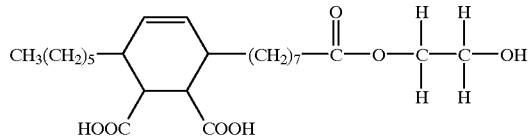

and salts and isomers thereof.

16. The antifreeze concentrate composition according to claim 13, wherein said cyclohexenoic acid is

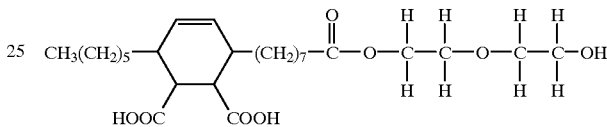

and salts and isomers thereof.

17. The antifreeze concentrate composition according to claim 13, wherein said cyclohexenoic acid is

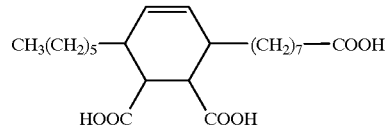

and salts and isomers thereof.

18. An antifreeze concentrate composition comprising:

(a) from about 90% to about 99.89% by weight of a liquid alcohol which functions as a freezing point depressant, or mixture thereof;

(b) from about 0.1% to about 5% by weight of a carboxylic acid, or salt, isomer or mixture thereof, wherein the carboxylic acid is selected from the group consisting of $C_4$–$C_{12}$ mono-carboxylic and di-carboxylic acids, and salts, isomers and mixtures thereof; and (c) from about 0.01% to about 2% by weight of a cyclohexenoic acid, or salt, isomer, or mixture thereof, having the following formula:

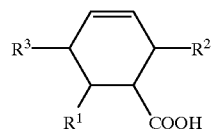

wherein $R^1$ is selected from the group consisting of OH, COOH, $C_1$–$C_{10}$ alkyl groups, glycol esters, and combinations thereof;

each of $R^1$ and $R^3$ is, independently, selected from the group consisting of H, OH, COOH, $C_1$–$C_{10}$ alkyl groups, glycol esters, and combinations thereof.

19. An antifreeze concentrate composition comprising:
(a) from about 90% to about 99.89% by weight of a liquid alcohol which functions as a freezing point depressant, or mixture thereof;
(b) from about 0.1% to about 5% by weight of a carboxylic acid, or salt, isomer or mixture thereof, wherein the carboxylic acid is selected from the group consisting of $C_4$–$C_{12}$ mono-carboxylic and di-carboxylic acids, and salts, isomers and mixtures thereof; and
(c) from about 0.01% to about 2% by weight of a cyclohexenoic acid, or salt, isomer, or mixture thereof, having the following formula:

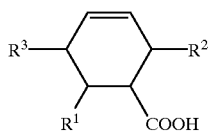

wherein $R^1$ is selected from the group consisting of OH, COOH, $C_1$–$C_{10}$ alkyl groups, glycol esters, and combinations thereof;
each of $R^2$ and $R^3$ is, independently, selected from the group consisting of H, OH, COOH, $C_1$–$C_{10}$ alkyl groups, glycol esters, and combinations thereof.

20. An antifreeze concentrate composition comprising:
(a) from about 90% to about 99.89% by weight of a liquid alcohol which functions as a freezing point depressant, or mixture thereof;
(b) from about 0.1% to about 5% by weight of a carboxylic acid, or salt, isomer or mixture thereof, wherein the carboxylic acid is selected from the group consisting of $C_4$–$C_2$ mono-carboxylic and di-carboxylic acids, and salts, isomers and mixtures thereof; and
(c) from about 0.01% to about 2% by weight of a cyclohexenoic acid, or salt, isomer, or mixture thereof, having the following formula:

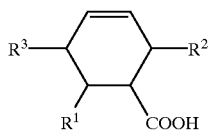

wherein $R^3$ is selected from the group consisting of OH, COOH, $C_1$–$C_{10}$ alkyl groups, glycol esters, and combinations thereof;
each of $R^1$ and $R^2$ is, independently, selected from the group consisting of H, OH, COOH, $C_1$–$C_{10}$ alkyl groups, glycol esters, and combinations thereof.

21. The antifreeze concentrate composition according to any one of claims 18–20, wherein the carboxylic acid is selected from the group consisting of 2-ethyl hexanoic acid, neodecanoic acid, neodecanoic acid, benzoic acid, t-butylbenzoic acid, dodecanedioic acid, sebacic acid, and salts, isomers and mixtures thereof.

22. The antifreeze composition according to any one of claims 1–3 or 12–2, wherein $R^3$ comprises a $C_1$–$C_{10}$ alkyl group.

23. The antifreeze composition according to claim 22 wherein $R^2$ has the structure $(CH_2)x$—$(COO)$—$[(CH_2)y$—$O]z$—H, or salt or isomer thereof;

where x is from 0 to 10;
y is from 1 to 5; and
z is from 0 to 5.

24. The antifreeze composition according to claim 23, wherein z is 0–2.

25. The antifreeze composition according to claim 23, wherein z is 1–2.

26. The antifreeze composition according to claim 23, wherein z is 2.

27. The antifreeze composition according to claim 23, wherein y is 2.

28. The antifreeze composition according to any one of claims 1–5, 12 or 13, wherein the cyclohexenoic acid component is present in an amount of from about 0.01% to about 1.0% by weight.

29. The antifreeze composition according to claim 28, wherein the cyclohexenoic acid component is present in an amount of from about 0.1% to about 1.0% by weight.

30. The antifreeze composition according to claims 28, wherein the cyclohexenoic acid component is present in an amount of from about 0.1% to about 0.3% by weight.

31. The antifreeze composition according to any one of claims 1–5, 12 or 13, wherein the liquid alcohol is selected from the group consisting of methanol, ethanol, propanol, ethylene glycol, diethylene glycol, triethylene glycol, propylene glycol, dipropylene glycol, butylene glycol, glycerol, the monoethylether of glycerol, the dimethylether of glycerol, alkoxy alkanols, and mixtures thereof.

32. The antifreeze composition of claim 31, wherein the liquid alcohol is selected from the group consisting of ethylene glycol, diethylene glycol, propylene glycol, dipropylene glycol, and mixtures thereof.

33. The antifreeze composition according to any one of claims 1–5, 12 or 13, wherein the carboxylic acid is selected from the group consisting of saturated and unsaturated, aliphatic and aromatic mono-, di- and tri-carboxylic acids, and salts, isomers and mixtures thereof.

34. The antifreeze composition according to claim 33, wherein the carboxylic acid is selected from the group consisting of $C_4$–$C_{12}$ mono-carboxylic and di-carboxylic acids, and salts, isomers and mixtures thereof.

35. The antifreeze composition according to claim 33, wherein the carboxylic acid is selected from the group consisting of 2-ethyl hexanoic acid, neodecanoic acid, neodecanoic acid, benzoic acid, t-butylbenzoic acid, dodecanedioic acid, sebacic acid, and salts, isomers and mixtures thereof.

36. The antifreeze composition according to claim 33, wherein the carboxylic acid is selected from the group consisting of sebacic acid, neodecanoic acid, and salts, isomers and mixtures thereof.

37. The antifreeze composition according to claim 33, wherein the carboxylic acid is 2-ethyl hexanoic acid or salts, isomers or mixtures thereof.

38. The antifreeze composition according to claim 33, wherein the carboxylic acid comprises a $C_8$ mono-carboxylic acid component, or salt, isomer or mixture thereof.

39. The antifreeze composition according to claims 33, wherein the carboxylic acid comprises a major amount of a $C_8$ mono-carboxylic acid component, or salt, isomer or mixture thereof, and neo-decanoic acid, or salt, isomer or mixture thereof.

40. The antifreeze composition according to any one of claims 1–5, 12 or 13, wherein the antifreeze composition further comprises one or more additional corrosion inhibitors selected from the group consisting of di-carboxylic acids, triazoles, thiazoles, phosphates, borates, silicates, molybdates, nitrates, nitrites and the alkali or alkaline earth metal, ammonium and amine salts thereof.

41. The antifreeze composition according to claim 40, wherein the antifreeze composition further comprises benzotriazole, mercaptobenzothiazole or tolyltriazole.

42. The antifreeze composition according to claim 40, wherein the antifreeze composition comprises up to about 5.5% by weight of the additional corrosion inhibitors.

43. The antifreeze composition according to any one of claims 1–5, 12 or 13, wherein the antifreeze composition further comprises an alkali metal hydroxide in an amount sufficient to adjust the pH of the composition to from about 6.0 to about 11.0.

44. The antifreeze composition according to claim 43, wherein the alkali metal hydroxide is present in an amount sufficient to adjust the pH of the composition to from about 6.5 to about 10.0.

45. The antifreeze composition according to any one of claims 1–5, 12 or 13, wherein the antifreeze composition further comprises one or more additives selected from the group consisting of dyes, odor masking agents, perfumes, antifoaming agents, lubricants, rust inhibitors, pH buffers, scale inhibitors, and sequestration and dispersion agents.

46. An antifreeze composition comprising the antifreeze concentrate composition according to any one of claims 1–5 or 13 and from about 25% to about 75% by weight water.

47. A method for inhibiting the corrosion of aluminum surfaces comprising the step of contacting said surfaces with an antifreeze composition according to claim 46.

48. A method for inhibiting the cavitation-erosion corrosion of aluminum surfaces comprising the step of contacting said surfaces with an antifreeze composition according to claim 46.

49. A method for inhibiting the corrosion of aluminum surfaces comprising the step of contacting said surfaces with an antifreeze composition according to any one of claims 1–5 or 13.

50. A method for inhibiting the cavitation-erosion corrosion of aluminum surfaces comprising the step of contacting said surfaces with an antifreeze composition according to any one of claims 1–5 or 13.

* * * * *

UNITED STATES PATENT AND TRADEMARK OFFICE
CERTIFICATE OF CORRECTION

PATENT NO.     : 6,391,257 B1
DATED          : May 21, 2002
INVENTOR(S)    : Peter M. Woyciesjes It is certified that error appears in the above-identified patent and that said Letters Patent is hereby corrected as shown below:

<u>Title page, Item [54] and Column 1, line 3,</u>
Title, insert -- CORROSION INHIBITORS -- after last word of title.

<u>Title page,</u>
Item [56], References Cited, OTHER PUBLICATIONS, "Beynon" reference, change "et." to -- et --; "Hudgens" reference, change "et." to -- et --.

<u>Column 1,</u>
Line 26, delete "," after "surfaces".
Line 36, delete "," after "thus".

<u>Column 4,</u>
Line 22, insert -- . -- after "thereof".
Lines 35-36, change first occurrence of "neodecanoic acid" to -- neoctanoic acid --
Lines 39 and 66, insert -- . -- after "thereof".
Line 49, insert -- . -- after "3:1".

<u>Column 5,</u>
Line 16, insert space before and after "0" in "from0to".
Line 53, delete "15" after "amount".

<u>Column 6,</u>
Line 2, insert -- . -- "thereof".

<u>Column 8,</u>
Table 1a, lines 19 and 22, insert -- ____ -- under "pH" and delete "____" under "Ratings".
Table 1b, lines 52 and 55, insert -- ____ -- under "pH" and delete "____" under "Ratings".

<u>Column 9,</u>
Table 2, lines 42, 45, 47, 50, 52 and 55, insert -- ___ -- under "pH" and delete "___" under "(100 hrs)"; insert -- ___ -- under "Cover" and delete "___" under "(300 hrs)"; insert -- ___ -- under "Cover" and delete "___" under "(1000 hrs)".

<u>Column 10,</u>
Table 3a, lines 56 and 58, insert -- ___ -- under "pH" and delete "___" under "(mg loss)".

UNITED STATES PATENT AND TRADEMARK OFFICE
CERTIFICATE OF CORRECTION

PATENT NO. : 6,391,257 B1
DATED : May 21, 2002
INVENTOR(S) : Peter M. Woyciesjes It is certified that error appears in the above-identified patent and that said Letters Patent is hereby corrected as shown below:

<u>Column 11,</u>
Table 3b, lines 18 and 19, insert -- ___ -- under "pH" and delete "___" under "ASTM D1384 (mg loss)".
Table 3c, lines 36, change "3:1" to -- 3.1 --.
Table 3c, line 43, insert -- ___ -- under "pH" and delete "___" under "ASTM D1384 (mg loss)".
Line 66, insert -- ___ -- under "pH".

<u>Column 12,</u>
Line 6, delete "___" under "ASTM D1384 (mg loss)".
Line 63, insert -- , -- between "and" and "as".

<u>Column 13,</u>
Table 3e, lines 13 and 14, insert -- ___ -- under "Miscellaneous" and delete "___" under "ASTM D1384 (mg loss)".

<u>Column 14,</u>
Table 4a, lines 46 and 47, insert -- ___ -- under "pH" and delete "___" under "ASTM D2570 (mg loss)".

<u>Columns 15-16,</u>
Table 4b, lines 21 and 23, insert -- ___ -- under "pH" and delete "___" under "(mg loss)".

<u>Column 15,</u>
Line 54, insert -- , -- between "and" and "as".

<u>Column 16,</u>
Table 5, line 58, insert -- ___ -- under "pH".

<u>Column 18,</u>
Lines 9 and 32, change "$R^1$ is selected" to -- $R^2$ is selected --.

<u>Column 20,</u>
Line 65, change "each of $R^1$ and $R^3$" to -- each of $R^2$ and $R^3$ --.

<u>Column 21,</u>
Line 22, change "wherein $R^1$" to -- wherein $R^2$ --.
Line 25, change "each of $R^2$" to -- each of $R^1$ --.
Line 58, change first occurrence of "neodecanoic acid" to -- neooctanoic acid --.

UNITED STATES PATENT AND TRADEMARK OFFICE
CERTIFICATE OF CORRECTION

PATENT NO. : 6,391,257 B1
DATED : May 21, 2003
INVENTOR(S) : Peter M. Woyciesjes It is certified that error appears in the above-identified patent and that said Letters Patent is hereby corrected as shown below:

Column 22,
Line 44, change first occurrence of "neodecanoic acid" to -- neooctanoic acid --.

Signed and Sealed this

Twenty-seventh Day of July, 2004

JON W. DUDAS
*Acting Director of the United States Patent and Trademark Office*